United States Patent
Raz et al.

(10) Patent No.: US 7,466,697 B1
(45) Date of Patent: Dec. 16, 2008

(54) LINK MULTIPLEXING MECHANISM UTILIZING PATH ORIENTED FORWARDING

(75) Inventors: Yaron Raz, Cupertino, CA (US); Uri Avimor, Ramat Hasharon (IL); Ofir Friedman, Rishon Letzion (IL); Lior Shabtay, Ramat Gan (IL)

(73) Assignee: Atrica Israel Ltd, Herzelia (IL)

( * ) Notice: Subject to any disclaimer, the term of this patent is extended or adjusted under 35 U.S.C. 154(b) by 1327 days.

(21) Appl. No.: 10/201,812

(22) Filed: Jul. 23, 2002

(51) Int. Cl.
*H04L 12/28* (2006.01)

(52) U.S. Cl. ........................ 370/389; 370/466
(58) Field of Classification Search ........... None
See application file for complete search history.

(56) References Cited

U.S. PATENT DOCUMENTS

| | | | |
|---|---|---|---|
| 6,185,189 B1 | 2/2001 | Brassier et al. | |
| 6,353,593 B1 | 3/2002 | Chen et al. | |
| 6,512,744 B1 | 1/2003 | Hughes et al. | |
| 6,658,021 B1* | 12/2003 | Bromley et al. | 370/466 |
| 6,904,018 B2* | 6/2005 | Lee et al. | 370/238 |
| 6,977,932 B1* | 12/2005 | Hauck | 370/392 |
| 2002/0093954 A1* | 7/2002 | Weil et al. | 370/389 |
| 2002/0101865 A1* | 8/2002 | Takagi et al. | 370/360 |
| 2002/0101870 A1* | 8/2002 | Chase et al. | 370/389 |
| 2002/0109879 A1* | 8/2002 | Wing So | 359/118 |
| 2002/0110119 A1* | 8/2002 | Fredette et al. | 370/389 |
| 2002/0181485 A1* | 12/2002 | Cao et al. | 370/419 |
| 2002/0196808 A1* | 12/2002 | Karri et al. | 370/468 |
| 2003/0021276 A1* | 1/2003 | Lee | 370/395.1 |
| 2003/0189898 A1* | 10/2003 | Frick et al. | 370/227 |
| 2003/0225906 A1* | 12/2003 | Natarajan et al. | 709/238 |
| 2004/0174865 A1* | 9/2004 | O'Neill | 370/352 |
| 2006/0127089 A1* | 6/2006 | Smith | 398/57 |

OTHER PUBLICATIONS

D. Awduche et al., "RSVP-TE: Extensions to RSVP for LSP Tunnels", Request for Comments 3209, Dec. 2001, pp. 1-61.
E. Rosen et al., "MPLS Label Stack Encoding", Request for Comments 3032, Jan. 2001, pp. 1-23.
Ping Pan et al., "Fast Reoute Extensions to RSVP-TE for LSP Tunnels", draft-ietf-mpls-rsvp-lsp-fastreroute-00.txt, Internet Engineering Task Force, Network Working Group, Jul. 2002, pp. 1-32.

* cited by examiner

*Primary Examiner*—Huy D. Vu
*Assistant Examiner*—Phuongchau B Nguyen
(74) *Attorney, Agent, or Firm*—Zaretsky Patent Group PC; Howard Zaretsky (57) ABSTRACT

A subport forwarding and provisioning mechanism whereby a plurality of subports implemented using slower speed processors are used to perform the packet processing for a higher speed packet stream. Outbound packets are assigned a subport based on their MPLS labels. Once assigned, the packets are forwarded to a particular subport. The output of all the subports is aggregated and combined into a single high speed packet stream and transmitted over the link. Inbound packets are received by the high speed PHY and forwarded to one of a plurality of subports. The subport chosen is the one having the same subport index as the one through which the packet was sent out over at the transmitting node. Conventional layer 2 switches can also be used whereby reserved source MAC addresses are assigned to subports. The switch forwards the inbound packets to one of the subports in accordance with the packet's source MAC address. The invention also comprises a mechanism for provisioning protection tunnels and a method for allocating subport bandwidth to subports.

55 Claims, 5 Drawing Sheets

LINK MULTIPLEXING MECHANISM UTILIZING PATH ORIENTED FORWARDING

FIELD OF THE INVENTION

The present invention relates generally to data communications and more particularly relates to a link multiplexing mechanism utilizing path oriented forwarding.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network.

Multiprotocol Label Switching (MPLS) based networks are becoming increasingly popular especially in traffic engineering IP networks. MPLS uses a label switching model to switch data over a Label Switched Path (LSP). The route of an LSP is determined by the network layer routing function or by a centralized entity (e.g., a Network Management System) from the topology of the network, the status of its resources and the demands of the user. Any suitable link state routing protocol may be used such as Open Shortest Path First (OSPF) or Intermediate System to Intermediate System (ISIS) routing protocol to provide the link state topology information needed by the network layer routing to engineer data traffic. It is also possible to use a local neighbor-discovery protocol and have a centralized management entity maintain the topology view. LSPs may be setup using any suitable signaling protocol such as RSVP-TE or CR-LDP or using the management plane (e.g., NMS setting the relevant MIB items that create the LSPs).

There is an ever-increasing demand by users for more and more bandwidth. In an attempt to meet this demand, carriers and network operators are installing larger capacity links capable of handling large and larger amounts of traffic. A problem arises, however, when the aggregate link speeds exceed the capacity of the internal circuits used to process the inbound and outbound packet streams. For example, consider a 10 GE input packet stream. Single-chip network processors fast enough to process the input packet stream may not be available and/or are cost prohibitive to use. One solution, therefore, is to split the input packet stream into smaller bandwidth links that can be processed by existing processors. A simple and efficient forwarding and provisioning mechanism is needed, however, to implement the splitting. In addition, the increasing use of MPLS requires that any solution be able to handle the MPLS protocol as well.

There is thus a need for a forwarding and provisioning mechanism that enables a high speed packet stream to be processed by multiple processors that operate at a slower rate that the inbound packet stream. The mechanism should be scaleable, flexible and not degrade the provisioning capacity of CIR traffic.

SUMMARY OF THE INVENTION

The present invention provides a link multiplexing mechanism utilizing path oriented forwarding. The mechanism comprises a subport forwarding and provisioning mechanism whereby a plurality of subports comprising slower speed processors are used to perform the packet processing for a higher speed packet stream. To provide the flexibility required for protocols such as MPLS, a network processor or FPGA is used to implement the subport. A network processor is a device optimized for packet processing while a FPGA can be programmed with any desired custom circuit to implement the required algorithms and processing.

Outbound packets are assigned a subport based on their MPLS labels. Once assigned, the packets are forwarded to a particular subport. The outputs of all the subports are aggregated and combined into a single high-speed packet stream and transmitted over the link. Inbound packets are received by the high speed PHY and forwarded to one of a plurality of subports. The subport chosen is the same subport as the one the packet was sent out from at the transmitting node. The subport is determined in accordance with the label within the packet itself. The subports used on both sides of the next hop, however, are independent. Thus, the subports may be different for each hop of the connection.

The invention also comprises a mechanism for provisioning protection tunnels wherein the outbound subport is always set equal to the inbound subport. In addition, the invention comprises an algorithm for allocating subport bandwidth to LSPs.

It is important to note that the invention is not limited by the type of network in use, the PHY layer, the type of protection paths used or by the type of signaling in use. Examples of applicable networks include, but are not limited to, Ethernet, MPLS and Private Network to Network Interface (PNNI) based Asynchronous Transfer Mode (ATM) networks.

Note that the invention is suited for implementation in hardware such as a network processor adapted to implement the mechanism of the present invention, software or a combination of hardware and software. In one embodiment, a network device comprising a processor, memory, etc. is operative to execute software adapted to perform the subport forwarding and provisioning mechanism of the present invention.

There is thus provided in accordance with the invention a method of forwarding a high speed packet stream to a plurality of subports of lesser speed in a label switching network, the method comprising the steps of assigning outbound packets to one of a plurality of subports in accordance with the label associated with each outbound packet, forwarding each outbound packet to its assigned subport, aggregating the output of a plurality of subports into a high speed packet stream and forwarding inbound packets from the high speed packet stream to a subport corresponding to the subport the inbound packet was originally sent out on.

There is also provided in accordance with the invention a method of forwarding a high speed packet stream to a plurality of subports of lesser speed in a label switching network, the method comprising the steps of assigning a unique Media Access Control (MAC) address to each subport, assigning outbound packets to one of a plurality of subports in accordance with the label associated with each outbound packet, forwarding each outbound packet to its assigned subport, setting the source MAC address of each outbound packet to the MAC address associated with its assigned subport, performing outbound processing on each outbound packet on each subport at the lesser speed, aggregating the output of a plurality of subports into a high speed packet stream and forwarding inbound packets from the high speed packet stream to a subport in accordance with the source MAC address of each inbound packet.

There is further provided in accordance with the invention an apparatus for forwarding a high speed packet stream to a plurality of subports of lesser speed in a label switching network, comprising assignment means for assigning outbound packets to one of a plurality of subports in accordance with the label associated with each outbound packet, a line interface adapted to transmit and receive a high speed packet stream, a plurality of subports, each subport of lesser speed than the line interface, a subport forwarding module in communication with the line interface and the plurality of subports, the subport forwarding module adapted to forward each outbound packet from its assigned subport to the line-interface and to forward inbound packets from the line interface to one of the plurality of subports in accordance with the label of each inbound packet.

There is also provided in accordance with the invention a network device for use in a label switching network comprising a switching fabric, a line interface adapted to interface to one or more data links, a plurality of subports, each subport of lesser speed than the speed of the line interface, a memory having at least one region for storing executable program code, a programmed central processor for executing the program code stored in the memory, wherein the program code further comprises code to assign outbound packets to one of a plurality of subports in accordance with the label associated with each outbound packet and a subport forwarding module in communication with the line interface and the plurality of subports, the subport forwarding module further comprises means for forwarding outbound packets from the subports to the line-interface and for forwarding inbound packets from the line interface to one of the plurality of subports in accordance with the label of each inbound packet.

There is further provided in accordance with the invention a network device for use in a label switching network comprising a switching fabric, a line interface adapted to interface to one or more data links, a plurality of subports, each subport of lesser speed than the speed of the line interface, a memory having at least one region for storing executable program code, a programmed central processor for executing the program code stored in the memory, wherein the program code further comprises code to assign a unique Media Access Control (MAC) address to each subport, code to assign outbound packets to one of a plurality of subports in accordance with the label associated with each outbound packet, a subport forwarding module in communication with the line interface and the plurality of subports, the subport forwarding module further comprising means for forwarding outbound packets from their assigned subport to the line interface, means for setting the source MAC address field of each outbound packet to the MAC address associated with the subport assigned thereto and means for forwarding inbound packets from the line interface to one of the plurality of subports in accordance with the contents of the source MAC address field of each inbound packet.

There is also provided in accordance with the invention a computer program product for use in a network device, the computer program product comprising a computer useable medium having computer readable program code means embodied in the medium for performing forwarding of packets to a plurality of subports, the computer program product comprising computer readable program code means for assigning outbound packets to one of a plurality of subports in accordance with the label associated with each outbound packet, computer readable program code means for forwarding each outbound packet to its assigned subport and computer readable program code means for forwarding inbound packets from a high speed packet stream to a subport corresponding to the subport having the same index as the one the inbound packet was originally sent out on.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| ATM | Asynchronous Transfer Mode |
| CAC | Call Admission Control |
| CD-ROM | Compact Disc-Read Only Memory |
| CIR | Committed Information Rate |
| CPU | Central Processing Unit |
| CRC | Cyclic Redundancy Check |
| CR-LDP | Constraint-based Label Distribution Protocol |
| CSIX | Common Switch Interface |
| DAT | Digital Audio Tape |
| DSP | Digital Signal Processor |
| DVD | Digital Versatile Disk |
| EEPROM | Electrically Erasable Programmable Read Only Memory |
| EIR | Excess Information Rate |
| EPROM | Erasable Programmable Read Only Memory |
| FDDI | Fiber Distributed Data Interface |
| FIS | Failure Indication Signal |
| FPGA | Field Programmable Gate Array |
| FRS | Fault Recovery Signal |
| GE | Gigabit Ethernet |
| IP | Internet Protocol |
| ISIS | Intermediate System to Intermediate System |
| LAN | Local Area Network |
| LD | Link Degraded |
| LDP | Label Distribution Protocol |
| LF | Link Failure |
| LSB | Least Significant Bit |
| LSP | Label Switched Path |
| LSR | Label Switching Router |
| MPLS | Multi-Protocol Label Switching |
| MSB | Most Significant Bit |
| NIC | Network Interface Card |
| NMS | Network Management System |
| OSPF | Open Shortest Path First |
| OSPF-TE | Open Shortest Path First with Traffic Engineering |
| PF | Path Failure |
| PG | Path Group |
| PML | Path Merge LSR |

-continued

| Term | Definition |
| --- | --- |
| PNNI | Private Network to Network Interface |
| PSL | Path Switch LSR |
| RAM | Random Access Memory |
| ROM | Read Only Memory |
| RPR | Resilient Packet Ring |
| RSVP | Reservation Protocol |
| RSVP-TE | Reservation Protocol with Traffic Engineering extensions |
| SDH | Synchronous Data Hierarchy |
| SONET | Synchronous Optical Network |
| WDM | Wavelength Division Multiplexing |

DEFINITIONS USED THROUGHOUT

The following terms and definitions apply throughout this document.

Rerouting is defined as a procedure for changing the route of a traffic path. Rerouting can serve as a recovery mechanism in which the broken path, the recovery path or segments of these paths are created dynamically after the detection of a fault on the working path. In other words, rerouting can serve as a recovery mechanism in which the recovery path is not pre-established. Rerouting can also serve as an optimization mechanism in which path routes are dynamically changed to ones that are better suited for current network conditions.

Protection switching is defined as a recovery mechanism in which the recovery path is created prior to the detection of a fault on the working path, path segment or network segment it protects. In other words, a recovery mechanism in which the recovery path is pre-established.

Protection bandwidth is defined as bandwidth on a link reserved for protection purposes, e.g., protection tunnels, bypass tunnels, recovery path, detour paths and protection paths.

The working path is the protected path that carries traffic before the occurrence of a fault. The working path exists, in MPLS networks for example, between a PSL and PML. The working path can be of different kinds; a hop-by-hop routed path, a trunk, a link, an LSP, part of an LSP, a group of LSP parts or part of a multipoint-to-point LSP. The term primary path is a synonym for working path. The active path is the path that is currently active, and can be the working (i.e. primary) path or the recovery (i.e. alternative or protection) path. Note that the term Label Switched Path (LSP) is intended to refer to a path implemented using any type of label switching protocol wherein the LSP of an MPLS based network is a specific example.

The recovery path is the path by which traffic is restored after the occurrence of a fault, i.e. the path over which the traffic is directed by the recovery mechanism. The recovery path may be established by MPLS means. The terms backup path, alternative path and protection path are synonyms for a recovery path.

A switchover is the process of switching the traffic from the path that the traffic is flowing on onto one or more alternate path(s). This may involve moving traffic from a working path onto one or more recovery paths, or may involve moving traffic from a recovery path(s) on to a more optimal working path(s). A switchback is the process of returning the traffic from one or more recovery paths back to the working path(s).

Revertive mode refers to a recovery mode in which traffic is automatically switched back from the recovery path to the original working path upon the restoration of the working path to a fault-free condition. This assumes a failed working path does not automatically surrender resources to the network. Non-revertive mode refers to a recovery mode in which traffic is not automatically switched back to the original working path after this path is restored to a fault-condition. Note that depending on the configuration, the original working path may, upon moving to a fault-free condition, become the recovery path, or it may be used for new working traffic, and be no longer associated with its original recovery path.

MPLS protection domain refers to the set of LSRs over which a working path and its corresponding recovery path are routed. MPLS protection plan refers to the set of all LSP protection paths and the mapping from working to protection paths deployed in an MPLS protection domain at a given time.

The term MPLS protection domain refers to the set of LSRs over which a working path and its corresponding recovery path are routed. The term MPLS protection plan refers to the set of all LSP protection paths and the mapping from working to protection paths deployed in an MPLS protection domain at a given time.

DETAILED DESCRIPTION OF THE INVENTION

The present invention provides a subport forwarding and provisioning mechanism whereby a plurality of subports comprising slower speed processors are used to perform the packet processing for a higher speed packet stream. To provide the flexibility required for protocols such as MPLS, a network processor or FPGA is used to implement the subport. A network processor is a device optimized for packet processing while a FPGA can be programmed with any desired custom circuit to implement the required algorithms and processing.

Outbound packets are assigned a subport based on their MPLS labels. Once assigned, the packets are forwarded to a particular subport. The output of all the subports is aggregated and combined into a single high-speed packet stream and transmitted over the link. Inbound packets are received by the high speed PHY and forwarded to one of a plurality of subports. The subport chosen is the same subport that the packet was sent out over at the transmitting node. The subport is determined in accordance with the label within the packet itself. The subports used on both sides of the next hop, however, are independent of the current hop. Thus, the subports may be different for each hop of the connection.

For illustration purposes, the principles of the present invention are described in the context of an MPLS based network employing any suitable routing such as OSPF-TE and signaling such as RSVP-TE signaling or uses management-plane based provisioning instead or in addition thereto. Further, it is intended that the mechanism of the present invention be implemented in network devices such as routers (e.g., LSRs in MPLS networks) making up the nodes in a network and include edge nodes and intermediate nodes. It is not intended, however, that the invention be limited to the configurations and embodiments described herein. It is appreciated that one skilled in the networking, electrical and/or software arts may apply the principles of the present invention to numerous other types of networking devices and network configurations as well without departing from the spirit and scope of the invention.

LSR With MPLS Label Subport Assignment

Figure 1:
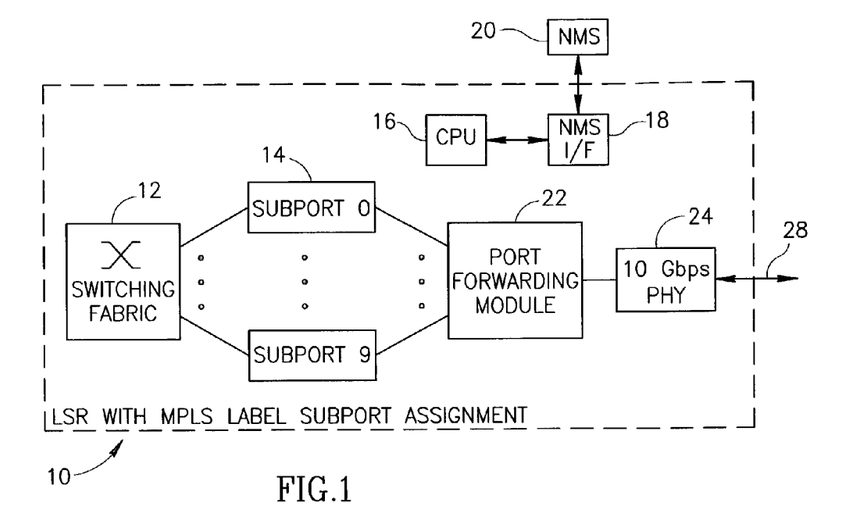
FIG. 1 is a diagram illustrating an example LSR with label based subport assignment constructed in accordance with a first embodiment of the present invention.

A diagram illustrating an example LSR with label based subport assignment constructed in accordance with a first embodiment of the present invention is shown in FIG. 1. The LSR network device, generally referenced 10, comprises a 10G PHY 24 coupled to a 10G link 28, a port forwarding module 22, a plurality of subports 14, labeled subport 0 through subport 9, switching fabric 12, CPU 16 and NMS interface 18. Note that the network device may comprise additional ports which are not shown for clarity.

To aid in understanding the invention, the example LSR shown comprises a 10G interface that is composed of ten individual 1G packet streams. The ten subports are provided wherein each is adapted to handle a 1G packet stream. The overall aggregate speed, however, is 10G. Due to the connection oriented approach of the MPLS protocol, the assignment of connections to subports can be done statically on an LSP basis. Note, that the high speed interface (e.g., 10G) may be trunked into any number of individual subports, e.g., 8, wherein 10 is used here by example only.

In accordance with the invention, the assignment of traffic to 1G subports is based on LSPs. Thus, the MPLS label is used in order to assign an incoming packet to one of the subports. The selected subport is the same for both sides of a 10G link. In the next link on the path, however, the subport may be different. This is because the next link may have other connections in addition to the 10G link and therefore it may be the case that a different subport is the only subport (or the subport best suited) that can accept the LSP with the required bandwidth. Note that it is the downstream (i.e. receiving) node that determines the subport it wants to receive the LSP on. This decision is communicated to the upstream (i.e. sending) node via the label that is assigned to the LSP.

As an example, consider two LSRS, LSR A and LSR B, each with 10 subports wherein each subport is mapped to an 8K range of labels. An LSP is to be provisioned from LSR A to LSR B. When the LSP is signaled or provisioned through management, the CAC in LSR B decides to accept the LSP on subport 3 and thus assigns a label comprising an indication that subport 3 was selected. The label is communicated to LSR A which now knows that the output subport should be subport 3 (i.e. the same subport is provisioned).

When a packet for the provisioned LSP is received over a link connected to LSR A, it is forwarded to subport 3 and subsequently out over the 10G link to LSR B with the previously assigned label indicating subport 3. The port forwarding module in LSR B examines the label in the received packet and in response thereto forwards the packet to subport 3 for packet processing. Unlabeled packets do not belong to any LSP. Usually these comprise control packets so there are not many of them. These unlabeled packets will always use a specific subport, for example, subport 8.

The port forwarding module functions to receive the 10G packet stream from the 10G PHY and examine the label in each received packet. The packet is then forwarded to one of the subports in accordance with the label. Note that the port assignment module may be implemented using any suitable processing platform. For example, a network processor may be used with suitable programming to implement the port forwarding module. Alternatively, an FPGA or an ASIC may be suitably configured and programmed to implement the required functionality.

In addition, the subports may be implemented using any suitable means. For example, commercially available network processors may be used to perform the packet processing at the subport speed (e.g., 1GE speeds). Alternatively, an FPGA may be suitably configured and programmed to perform the required packet processing.

The CPU 16 in the LSR performs the conventional LSR functionality including the provisioning of LSPs. In particular, the CPU functions to perform the assignment of subports to LSPs in response to LSP setup requests. The CPU executes a bandwidth allocation algorithm, described in more detail infra, that controls the allocation of bandwidth of each subport. Once a subport is assigned, a label is generated so as to indicate the subport assignment. The label is then sent to the requesting node or to a management entity to complete the LSP setup process. In case the label is sent to a management entity, the management entity is adapted to send the label to the upstream node in order for the upstream node to know how to label packets belonging to this LSP. The LSR also comprises an NMS interface 18 for interfacing an external NMS 20 which is in communication with the network to the CPU 16.

LSR with Source MAC Based Subport Forwarding

In a second embodiment of the invention, the port forwarding module does not have the ability to extract MPLS labels from the inbound received packets. The module may comprise, for example, a commercially available layer 2 switch integrated circuit such as those manufactured by Broadcom, Irvine, Calif. Layer 2 switch integrated circuits (ICs) typically comprise a high speed port on one side and a plurality of lower speed ports on the other. For example, one 10 GE port and 8, 10 or 12 one GE ports. Each of the one GE links make up the subports of the aggregate 10GE link. The traffic directed to each one GE port is input to a packet processor (i.e. network processor) adapted to handle the one GE packet stream.

Figure 2:
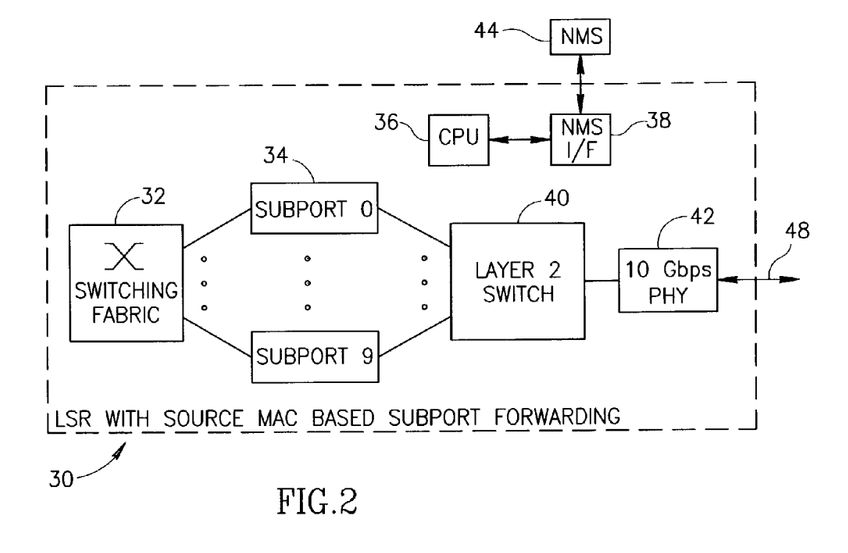
FIG. 2 is a diagram illustrating an example LSR with label based subport assignment and source MAC packet steering constructed in accordance with a second embodiment of the present invention.

A diagram illustrating an example LSR with label based subport assignment and source MAC packet steering constructed in accordance with a second embodiment of the present invention is shown in FIG. 2. The LSR, generally referenced 30, is constructed similarly to the LSR 10 shown in FIG. 1. In particular, the LSR network device 30 comprises a 10G PHY 42 coupled to a 10G link 48, a commercially available layer 2 switch 40, a plurality of subports 34, labeled subport 0 through subport 9, switching fabric 32, CPU 36 and NMS interface 38 that is in communication with NMS 44.

The example LSR 30 comprises a 10G interface that is composed of ten individual 1G packet streams. The ten subports are provided wherein each is adapted to handle a 1G packet stream. The overall aggregate speed, however, is 10G. The assignment of traffic to 1G subports is based on LSPs wherein the MPLS label is used in order to assign an incoming packet to one of the subports. The selected subport is the same for both sides of a 10G link. In the next link on the path, however, the subport may be different. This is because the next link may have other connections in addition to the 10G link and therefore it may be the case that a different subport is the only subport that can accept the LSP with the required bandwidth. Note that it is the downstream (i.e. receiving) node that determines the subport it wants to receive the LSP on. This decision is communicated to the upstream (i.e. sending) node via the label that is assigned to the LSP.

As described supra, the assignment of traffic to the subports is based on LSPs where the MPLS label is used to assign an inbound packet to one of the subports. A problem arises when the commercially available layer 2 chip does not support MPLS label lookups. The present invention provides a solution whereby the MAC address is used to forward packets to one of the subports.

Standard 10G line interface cards expect the destination MAC address to always be its own specific MAC address or a broadcast/multicast MAC address but typically do not care about the source MAC address. In accordance with the invention, therefore, the source MAC address is used to identify the subport rather than the destination MAC address. Thus, in the example provided here, a source MAC address is selected and assigned to each subport.

If the layer 2 switch chip determines the subport based on the CRC of the source MAC address, the MAC addresses assigned should be such that their CRCs can be used to indicate the assigned subport. Thus, each 10G line interface card is assigned a set of 10 different MAC addresses.

For example, some commercially available layer 2 switches can determine the destination port for a packet destined to a LAG (Link Aggregation Group) based on a CRC of the source MAC modulo the number of ports in the LAG. This can be used for spreading the packets to the subports by using the layer-2 switch as the port-forwarding module and defining its ports leading to the different subports as a single LAG. Therefore, each line interface is allocated 10 MAC addresses that can be burned into onboard nonvolatile memory, e.g., EEPROM, etc. The MAC addresses are allocated such that each of the ten MAC address allocated for a single line interface card generates CRC who's 3 LSBs are different. Each subport is assigned a MAC address such that the 3 LSBs of the CRC of the MAC address correspond to the subport number. Note that that ten contiguous MAC addresses do not produce ten different results due to the CRC operation. Therefore, the CPU or other central entity (such as during the manufacturing process) maintains a separate MAC address list for each subport. Each 10GE line interface card is then allocated one MAC address from each of the ten lists.

Figure 3:
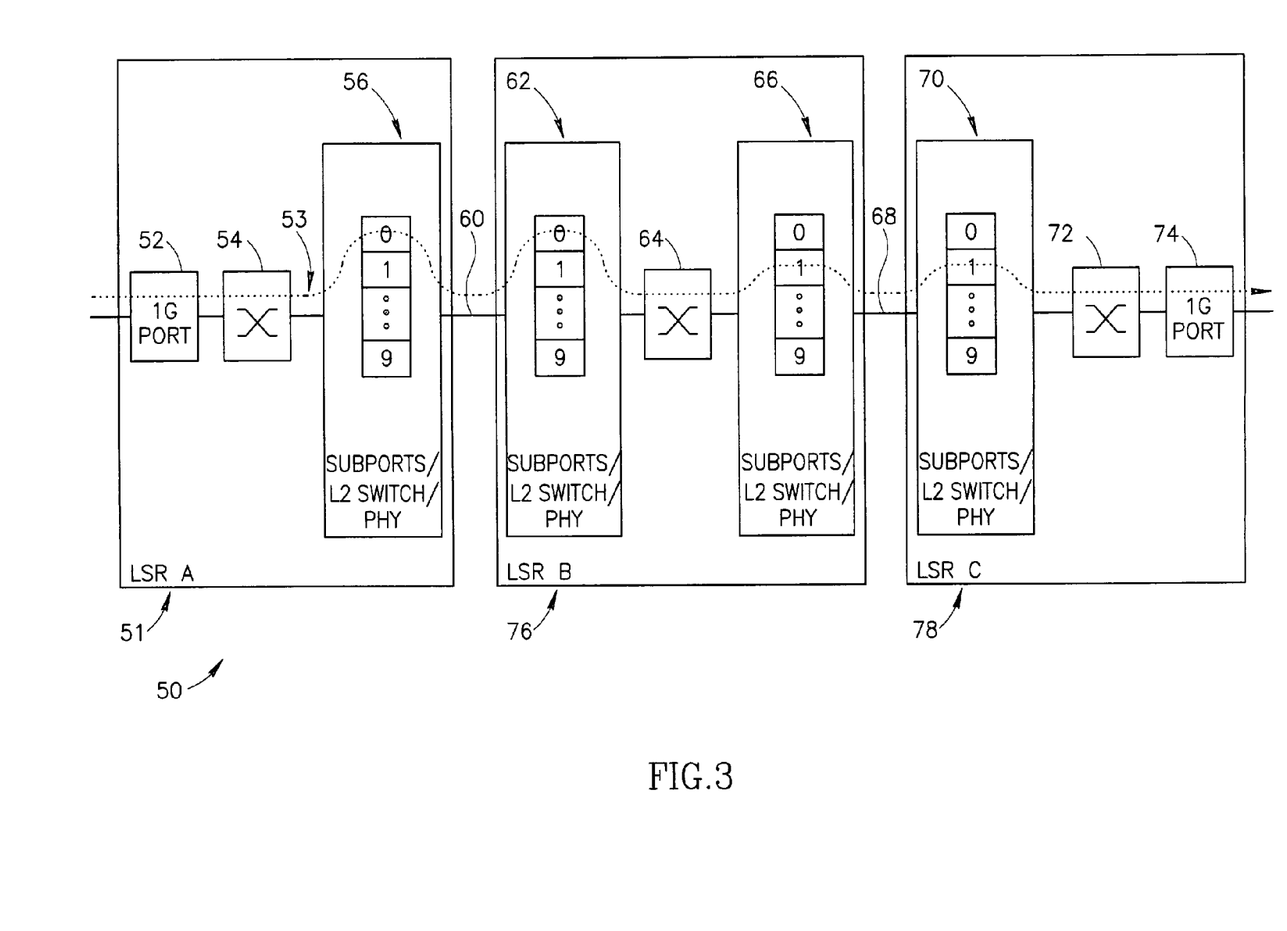
FIG. 3 is an example network illustrating the subport forwarding and provisioning mechanism of the present invention.

An example network illustrating the subport forwarding and provisioning mechanism of the present invention is shown in FIG. 3. Consider a portion of a network, generally referenced 50, comprising three LSRs, LSR A, LSR B and LSR C. LSR A 51 comprises 1G port 52, switching fabric 54 and module 56 comprising 10 subports, layer 2 switch and 10 GE PHY. Similarly, LSR B 76 comprises switching fabric 64 and modules 62, 66 comprising 10 subports, layer 2 switch and 10 GE PHY. LSR C 78 comprises 1G port 74, switching fabric 72 and module 70 comprising 10 subports, layer 2 switch and 10 GE PHY. LSR B is connected to LSR A via 10 GE link 60 and to LSR C via 10 GE link 68.

Figure 4:
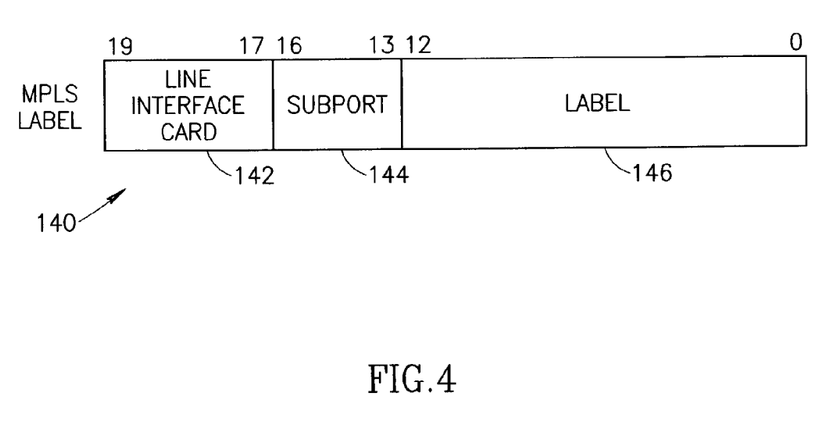
FIG. 4 is a diagram illustrating the structure of the label used to indicate the subport in the second embodiment of the present invention.

Consider an LSP to be setup through LSR A to LSR C. When the LSP is signaled, the CAC in LSR C decides to provision the LSP on subport 1 and therefore assigns the label 0x22003. With reference to FIG. 4, each label 140 comprises 20 bits or 5 nibbles where the first three bits indicate 1 of 8 line interface cards, bits 16 to 13 indicate the subport and bits 12 to 0 indicate the actual label. In this example, the label 0x22003 indicates line interface card 1, subport 1 and label 3.

The label generated by LSR C is communicated to LSR B which tells LSR B that the outbound subport (to LSR C) should be subport 1. The CAC in LSR B determines that the best subport for receiving the LSP is on subport 0 on the inbound link and therefore assigns a label of 0x40005. This label indicates line interface card 2, subport 0 and label 5. The label is communicated to LSR A who then knows by the output label that it is to assign the LSP to subport 0. The provisioned path indicating the LSR ports and subports is represented by the dotted line 53.

The data path for this LSP is as follows. When a packet for this LSP is received on the 1G port 52 of LSR A, it is sent out on the 10G link 60 with the destination MAC address of the next LSR (i.e. LSR B). A specific reserved source MAC address that identifies subport 0 and the assigned label 0x40005 is inserted into the packet. At LSR B, the layer 2 switch forwards the packet to subport 0. It passes through the switching fabric 64 and continues to the output line interface card to subport 1. LSR B then sends the packet with the destination MAC address of LSR C with the reserved MAC address of subport 1 and an MPLS label of 0x22003. Upon receipt, LSR C examines the label and according to the source MAC address, forwards the packet to subport 1.

In an alternative embodiment, an additional VLAN label can be used in each packet instead of using a special source MAC address for directing the packet to one of the subports. Note, however, that although this scheme provides the direction, it is less efficient.

Link Protection Tunnel Provisioning

The invention also comprises a mechanism for provisioning protection tunnels for links. In order to protect a link, a tunnel is created which connects the two sides of the link. When a high speed line such as 10G link fails, it is preferable if the packets travel along the protection tunnel associated with the link using the same subport mapping along the entire path of the tunnel. A single tunnel is used for protecting a single link. Thus, after inserting the protection tunnel label, a single label is used for the protection tunnel by all subport network-processors of the same 10G port. This occurs for each port that is along the path of the protection tunnel LSP.

The consequence of this is that the labels associated with the protection tunnel cannot be taken from the range of labels allocated to a particular subport as is the case in the first and second embodiments described supra. Rather, a specific range of labels is used which is taken from a special range of labels reserved for use as 'control labels' for protection tunnel labels only. The label space for protection tunnels can contain any number of labels, e.g., 1K labels.

One way to configure protection tunnels is to use a central entity such as a Network Management System (NMS) using a mechanism whereby the LSR in each hop of the LSP is instructed that a label is required for a protection tunnel. Within each protection-tunnel LSP, each subport sends inbound packets received with a protection tunnel label to the subport of the destination 10G port that has the same subport-ID as the one it was supposed to go through in the link that failed. In the first hop of the protection tunnel, the LSR that sends the packet to the protection tunnel is the one that originally was to send it to the link that has failed, thus it knows exactly to which subport the packet was supposed to be sent. In the other LSRs through which the protection-tunnel passes, the packet is forwarded to the subport of the destination 10G port that has the same subport-ID as the one it was received on.

The same logic can be implemented using the inner label to decide which subport each packet is to be sent to in each hop. The inner label remains constant along the path of the protection tunnel, thus the packet uses the same subport in all 10G links along the path of the protection tunnel. The general logic in the port-forwarding module is to always use the outer most label unless it is a label of a protection tunnel, in which case the second label is used.

LSP to Subport Allocation

The invention also comprises a mechanism to improve the ability to handle wide connections. Wide connections are connections that require a relatively large amount of CIR bandwidth. For example, a connection of 500 Mbps, 700 Mbps or even a connection of 1 Gbps may need to be supported. There remains, however, the problem of fragmentation. Consider, for example, 300 Mbps of CIR bandwidth that is already allocated on each of the ten subports of a 10G port.

In this case, a connection of 800 Mbps cannot be allocated on it even though the 10G port has 5600 M of free bandwidth.

The invention provides a scheme for allocating LSP bandwidth to subports that helps in solving the problem described above in a way that provides a tradeoff between leaving subports empty for wide LSPs and spreading traffic between subports for best utilizing the bandwidth of the link (e.g., for EIR traffic). The central idea is to leave one or more subports empty (i.e. no bandwidth used) in the event a wide connection is to be allocated. The allocated bandwidth, however, is still distributed among the subports in such a way that EIR traffic is supported.

Figure 5:
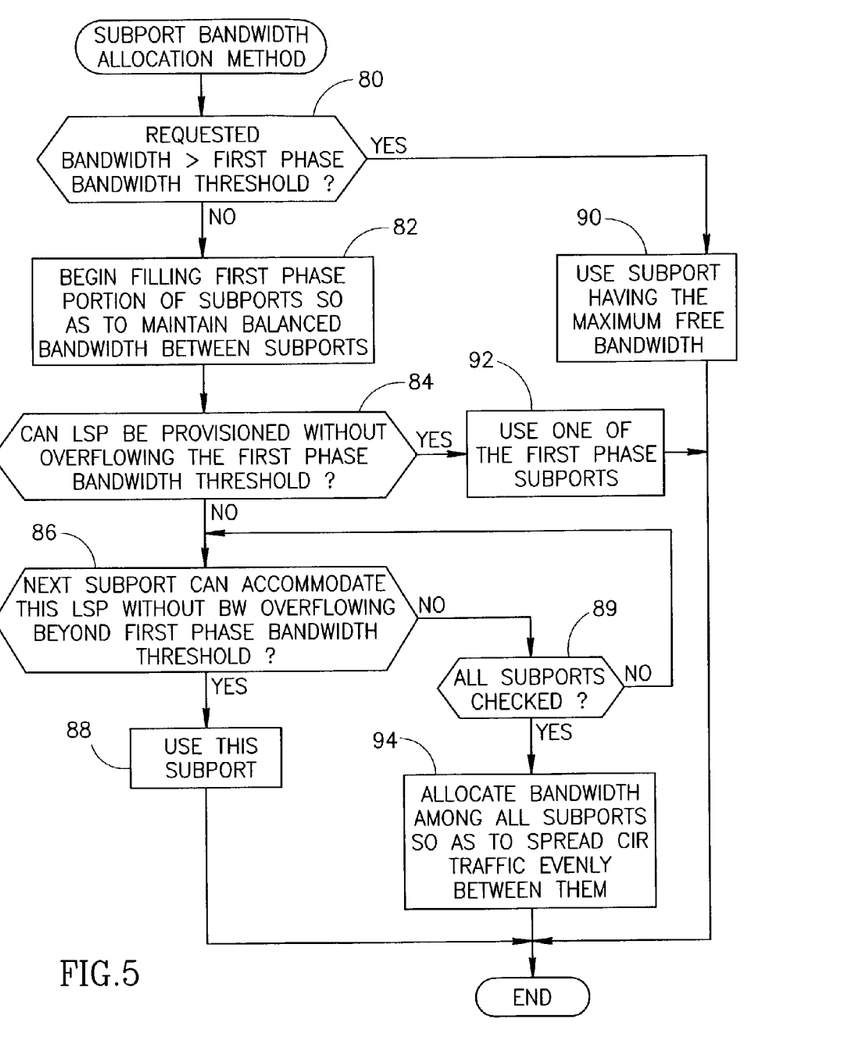
FIG. 5 is a flow diagram illustrating the subport bandwidth allocation method of the present invention in more detail.

A flow diagram illustrating the subport bandwidth allocation method of the present invention in more detail is shown in FIG. 5. The method uses a single parameter, called first_phase_bandwidth_threshold. For the case of 1G subports, the value of this parameter is set between 100M and 900M. The default value can be set to 600M. It is first checked if the requested bandwidth exceeds the first_phase_bandwidth_threshold (step 80). If it does, the subport having the most free bandwidth is used (step 90). Otherwise, the method begins filling a first_phase portion of subports (step 82). The value of the first_phase portion may be approximately ½ the number of subports, e.g., 4 to 6 in the case of ten subports. If each subport is handled by a different network processor, the first phase portion comprises subports 0 through 4. In the case that network processors are used that handle two subports each, then the first phase portion comprises one subport from each network processor (i.e. subports 0, 2, 4, 6, 8).

If the LSP can be provisioned in one of the first phase portion ports without the amount of bandwidth allocated for it overflowing beyond the first_phase_bandwidth_threshold (step 84), one of the first phase portion subports is used (step 92). This subport should be one in which this LSP can be provisioned without overflowing beyond the first-phase-bandwidth-threshold. Note that preferably the provisioned LSPs are spread between these ports so that bandwidth is balanced between them.

If the LSP cannot be provisioned in one of the first phase portion subports without overflowing beyond the first_phase_bandwidth_threshold, than it is checked whether the next subport can accommodate this LSP without the bandwidth in it overflowing beyond the first_phase_bandwidth_threshold (step 86). If so, this subport is used (e.g., the $6^{th}$ subport) (step 88). If not, it is determined whether all the subports have been checked (step 89). If not, the method continues with step 86.

This process continues for each new LSP, whereby allocating bandwidth to one of the first five subports is attempted. If this does not succeed without crossing the first_phase_bandwidth_threshold, the $6^{th}$ subport is tried. If allocating bandwidth in the $6^{th}$ subport without crossing the first_phase_bandwidth_threshold is not successful, the method attempts to allocate using the $7^{th}$ subport, and so on.

After all the subports have been checked (step 89), i.e. after all ten subports are allocated beyond the first_phase_bandwidth_threshold, bandwidth begins to be allocated from all ten subports in a way that spreads the CIR traffic evenly among them (step 94).

Note that the scheme described above is most useful when the 10G module first starts up. Eventually, the entire bandwidth of the port is allocated and then certain LSPs are removed and others added. Once this occurs, it becomes increasingly difficult to control the spreading of bandwidth among the subports. Ultimately, only the addition of new LSPs can be controlled. If the user removes LSPs that are spread between different subports, it may become difficult to allocate bandwidth for wide connections even though a sufficient amount of bandwidth is available.

A solution to this problem is to perform a defragmentation process which functions to relocate LSPs among the subports. Another solution is to maximize the size of each subport. For example, this problem is much less severe using 2.5G subports instead of 1G since the amount of bandwidth available per subport is greater thus permitting the first_phase_bandwidth_threshold to be set higher.

NETWORK DEVICE EMBODIMENT

A network device can be adapted to implement the subport forwarding and provisioning mechanism of the present invention. Hardware means and/or software means adapted to execute the mechanism may be incorporated within a network device such as a Label Switching Router (LSR) adapted to implement the MPLS protocol, network switch, Network Management System or any other wired or wireless network device. The device may be constructed using any combination of hardware and/or software.

Figure 6:
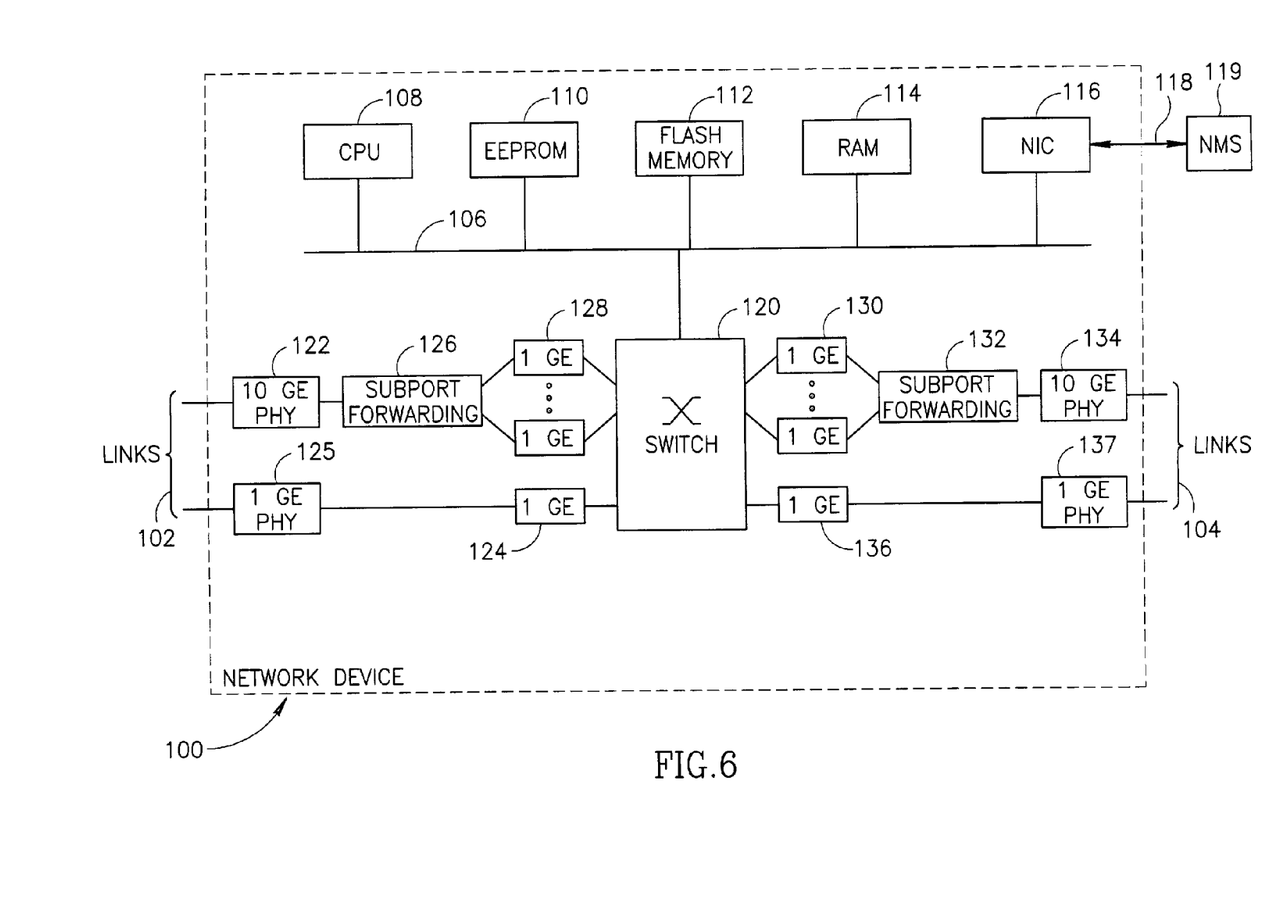
FIG. 6 is a block diagram illustrating an example network device incorporating the subport forwarding and provisioning mechanism of the present invention.

A block diagram illustrating an example network device such as a link switched router incorporating the subport forwarding and provisioning mechanism of the present invention is shown in FIG. 6. The network device, generally referenced 100, comprises a processor 108 which may be implemented as a microcontroller, microprocessor, microcomputer, ASIC core, FPGA core, central processing unit (CPU) or digital signal processor (DSP) or any other suitable computing means. The system further comprises non volatile memory including EEPROM 110 for storing configuration and network related parameters, Flash memory 112 for storing program code and configuration parameters and dynamic main memory (e.g., RAM) 114 all in communication with the processor. The processor is also in communication, via a bus 106, with a number of peripheral devices that are also included in the computer system. A single modular LSR may be built of a number of modules (e.g., cards), each containing part of the switching fabric and a number of line interfaces. Each such module may contain a CPU subsystem of its own, including CPU and volatile as well as non-volatile memory.

The network device comprises a NIC 116 for providing an out of band interface 118 for connecting to external entities such as a craft for local maintenance and configuration purposes, an NMS 119 for centralized administration and control or a Local Area Network (LAN). The device may comprise additional interfaces, such as a serial interface for connecting to a PC for configuration purposes.

The network device also comprises a switching fabric 120 for providing the switching functionality of the network device. In particular, the switching fabric may be constructed from one or more network processors, ASICs or FPGA circuits. The switching fabric may comprise, for example, hardware for performing MPLS, Frame Relay, ATM switching, CSIX or any other fabric to network interface protocol. Note that the switching fabric may be implemented in any suitable manner such as a microcontroller, microprocessor, microcomputer, ASIC core, FPGA core, central processing unit (CPU) or digital signal processor (DSP) or any other computing means.

The network device also comprises means for performing the subport forwarding and provisioning mechanism in accordance with the present invention. As an example, both inbound and outbound support is illustrated. The network device is shown comprising a 10 GE line interface (i.e. PHY) 134 connected to a 10 GE link 104. The subport forwarding module 132 directs the inbound packets to one of ten 1 GE network processors 130. The 1G streams are then input to the switching fabric 120. Similarly, outbound means is also provided comprising ten 1 GE network processors 128, subport forwarding module 126 and 10GE line interface 122 coupled to link 102. Note that physically, inbound and outbound means may comprise the same components. Also shown are one or more 1GE line interface/network processors 136, 124 coupled to links 104, 102, respectively, through 1G line interfaces (i.e. PHY) 137, 125, respectively, both of whose output is connected to the switching fabric. Note that the invention is not limited to the use of 10GE or 1GE network processors as the input data stream and subport network processors may have any desired speed in accordance with the implementation of the invention. In addition, the invention is not limited to a single link of each type as any number of links of each type may be used. Further, the interface cards may be adapted to interface to any type of communication links such as any variety of copper or optical based Ethernet, Token Ring, FDDI, SONET/SDH, ATM, RPR, etc.

The subport forwarding modules may be constructed in accordance with either the first or the second embodiment of the invention. In the former case, the module is adapted to assign subports and forward packets according to the labels in the packet. In the latter case, the assignment of the subport is performed according to the packet label but the forwarding is done according to the source MAC address.

The network device also comprises an optional user interface (not shown) adapted to respond to user inputs and provide feedback and other status information. A host interface (not shown) enables communication with a host computing device and may be implemented via software executed by the CPU. The host may be adapted to configure, control and maintain the operation of the device. The device may also comprise magnetic storage device means for storing application programs and data.

The network device comprises computer readable storage medium which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the subport forwarding and provisioning mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform the subport forwarding and provisioning mechanism of the present invention or any portion thereof may also reside, in whole or in part, in the static or dynamic main memories or in firmware within the processor of the network device (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), DSP circuits, network processors, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of forwarding a high speed packet stream to a plurality of subports of lesser speed in a label switching network, said method comprising the steps of:
provisioning inbound traffic on a downstream node to one or more subports in accordance with a label switched path and transmitting resultant subport assignments to an upstream node, said upstream node in communication with said downstream node via a communications link;
forwarding each outbound packet to be transmitted to a subport in said upstream node in accordance with the label associated with said outbound packet previously assigned by said downstream node;
aggregating the output of a plurality of subports at said upstream node into a high speed packet stream and forwarding said high speed packet stream over said communications link; and
forwarding inbound packets transmitted by said upstream node and received over said communications link by said downstream node to a subport in accordance with the label associated with said inbound packet.

2. The method according to claim 1, wherein said label switching network comprises a label switching protocol based network.

3. The method according to claim 1, wherein said label switching network comprises a Multiprotocol Label Switching (MPLS) protocol based network.

4. The method according to claim 1, wherein the subports comprise ten subports each capable of handling 1 Gbps traffic stream.

5. The method according to claim 1, wherein the subports comprise eight subports each capable of handling 1 Gbps traffic stream.

6. The method according to claim 1, wherein the subports comprise four subports each capable of handling 2.5 Gbps traffic stream.

7. The method according to claim 1, wherein said high speed packet stream comprises a 10 Gigabit Ethernet (GE) stream.

8. The method according to claim 1, wherein each subport comprises a network processor.

9. The method according to claim 1, wherein each subport comprises part of a network processor.

10. The method according to claim 1, wherein said label comprises a Multiprotocol Label Switching (MPLS) protocol label.

11. The method according to claim 1, further comprising the step of provisioning one or more protection tunnels wherein each protection tunnel protects traffic mapped to all subports by forwarding packets such that each packet enters and exits a node via the same subport number.

12. The method according to claim 1, further comprising the step of assigning packets to subports according to an assignment algorithm wherein the capacity of a portion of subports is filled first before using the capacity of the remaining subports so as to reserve bandwidth for wide connections.

13. The method according to claim 1, further comprising the step of assigning packets to subports according to an assignment algorithm wherein a specific amount of the capacity of a portion of subports is filled first before using the capacity of the remaining subports in order to reserve bandwidth for wide connections and to reserve part of the bandwidth in used subports for Excess Information Rate (EIR) traffic.

14. The method according to claim 1, further comprising the step of assigning packets to subports according to an assignment algorithm wherein each of the subports is filled first up to a specific level before using the remaining capacity of the subports in order to reserve part of the bandwidth in used ports for Excess Information Rate (EIR) traffic.

15. The method according to claim 1, adapted to be implemented in an Application Specific Integrated Circuit (ASIC).

16. The method according to claim 1, adapted to be implemented in a Field Programmable Gate Array (FPGA).

17. A method of forwarding a high speed packet stream to a plurality of subports of lesser speed in a network device within a label switching network, said method comprising the steps of:
  assigning a unique Media Access Control (MAC) address to each subport;
  provisioning inbound traffic to one or more subports in accordance with a label switched path and transmitting resultant subport assignments to an upstream node, said upstream node in communication with said network device via a communications link;
  forwarding each outbound packet to be transmitted to a subport in said upstream node in accordance with the label associated with said outbound packet previously assigned by said downstream node;
  setting the source MAC address of each outbound packet to the MAC address of its corresponding provisioned subport;
  aggregating the output of a plurality of subports at said upstream node into a high speed packet stream and forwarding said high speed packet stream over said communications link; and
  forwarding inbound packets received by said network device over said communications link from said upstream node to one of said plurality of subports in accordance with the source MAC address of each inbound packet.

18. The method according to claim 17, wherein said label switching network comprises a label switching protocol based network.

19. The method according to claim 17, wherein said label switching network comprises a Multiprotocol Label Switching (MPLS) protocol based network.

20. The method according to claim 17, wherein the subports comprise ten subports each capable of handling 1 Gbps traffic stream.

21. The method according to claim 17, wherein the subports comprise eight subports each capable of handling 1 Gbps traffic stream.

22. The method according to claim 17, wherein the subports comprise four subports each capable of handling 2.5 Gbps traffic stream.

23. The method according to claim 17, wherein said high speed packet stream comprises a 10 Gigabit Ethernet (GE) stream.

24. The method according to claim 17, wherein each subport comprises a network processor.

25. The method according to claim 17, wherein each subport comprises part of a network processor.

26. The method according to claim 17, wherein said label comprises a Multiprotocol Label Switching (MPLS) protocol label.

27. The method according to claim 17, further comprising the step of provisioning one or more protection tunnels wherein each protection tunnel protects traffic mapped to all subports by forwarding packets such that each packet enters and exits a node via the same subport number.

28. The method according to claim 17, further comprising the step of assigning packets to subports according to an assignment algorithm wherein the capacity of a portion of subports is filled first before using the capacity of the remaining subports so as to reserve bandwidth for wide connections.

29. The method according to claim 17, further comprising the step of assigning packets to subports according to an assignment algorithm wherein a specific amount of the capacity of a portion of subports is filled first before using the capacity of the remaining subports in order to reserve bandwidth for wide connections and to reserve part of the bandwidth in used subports for Excess Information Rate (EIR) traffic.

30. The method according to claim 17, further comprising the step of assigning packets to subports according to an assignment algorithm wherein each of the subports is filled first up to a specific level before using the remaining capacity of the subports in order to reserve part of the bandwidth in used ports for Excess Information Rate (EIR) traffic.

31. The method according to claim 17, adapted to be implemented in an Application Specific Integrated Circuit (ASIC).

32. The method according to claim 17, adapted to be implemented in a Field Programmable Gate Array (FPGA).

33. An apparatus for forwarding a high speed packet stream to a plurality of subports of lesser speed in a label switching network, comprising:
  a line interface coupled to a communications link and adapted to transmit and receive a high speed packet stream thereon;
  a plurality of subports, each subport of lesser speed than said line interface;
  means for provisioning inbound traffic on a downstream node to a plurality of subports in accordance with a label switched path and transmitting resultant subport assignments to an upstream node, said upstream node in communication with said downstream node via a communications link;
  a subport forwarding module in communication with said line interface and said plurality of subports, said subport forwarding module adapted to receive outbound packets from said plurality of subports, each outbound packet assigned to a subport in accordance with the label associated therewith, to aggregate said outbound packets into a high speed packet stream, to forward said high speed packet stream to said line-interface for transmission over said communications link and to forward inbound packets received over said communications link to one of said plurality of subports in accordance with the label associated with each said inbound packet.

34. The apparatus according to claim 33, further comprising means for assigning a unique source Media Access Control (MAC) address to each subport and to set the source MAC address of each outbound packet to the MAC address associated with the subport the outbound packet is assigned to.

35. The apparatus according to claim 33, wherein said label switching network comprises a label switching protocol based network.

36. The apparatus according to claim 33, wherein said label switching network comprises a Multiprotocol Label Switching (MPLS) protocol based network.

37. The apparatus according to claim 33, wherein said plurality of subports comprise ten subports each capable of handling 1 Gbps traffic stream.

38. The apparatus according to claim 33, wherein the subports comprise eight subports each capable of handling 1 Gbps traffic stream.

39. The apparatus method according to claim 33, wherein said plurality of subports comprise four subports each capable of handling 2.5 Gbps traffic stream.

40. The apparatus according to claim 33, wherein said high speed packet stream comprises a 10 Gigabit Ethernet (GE) stream.

41. The apparatus according to claim 33, wherein each subport comprises a network processor.

42. The apparatus according to claim 33, wherein each subport comprises part of a network processor.

43. The apparatus according to claim 33, wherein said label comprises a Multiprotocol Label Switching (MPLS) protocol label.

44. The apparatus according to claim 33, further comprising means for provisioning one or more protection tunnels wherein each protection tunnel protects traffic mapped to all subports by forwarding packets such that each packet enters and exits a node via the same subport number.

45. The apparatus according to claim 33, further comprising means for assigning packets to subports according to an assignment algorithm wherein the capacity of a portion of subports is filled first before using the capacity of the remaining subports so as to reserve bandwidth for wide connections.

46. The apparatus according to claim 33, further comprising means for assigning packets to subports according to an assignment algorithm wherein a specific amount of the capacity of a portion of subports is filled first before using the capacity of the remaining subports in order to reserve bandwidth for wide connections and to reserve part of the bandwidth in used subports for Excess Information Rate (EIR) traffic.

47. The apparatus according to claim 33, further comprising means for assigning packets to subports according to an assignment algorithm wherein each of the subports is filled first up to a specific level before using the remaining capacity of the subports in order to reserve part of the bandwidth in used ports for Excess Information Rate (EIR) traffic.

48. The apparatus according to claim 33, adapted to be implemented in an Application Specific Integrated Circuit (ASIC).

49. The apparatus according to claim 33, adapted to be implemented in a Field Programmable Gate Array (FPGA).

50. A network device for use in a label switching network, comprising:
a switching fabric;
a line interface adapted to interface to one or more data links;
a plurality of subports, each subport of lesser speed than the speed of said line interface;
a memory for storing executable program code;
a central processor programmed to execute said program code stored in said memory, wherein the program code further comprises code for provisioning inbound traffic to one or more subports in accordance with a label switched path and transmitting resultant subport assignments to an upstream node, said upstream node in communication with said network device via said one or more data links; and
a subport forwarding module in communication with said line interface and said plurality of subports, said subport forwarding module further comprising means for receiving outbound packets from said plurality of subports, each outbound packet assigned to a subport in accordance with the label associated therewith, aggregating said outbound packets into a high speed packet stream, forwarding said high speed packet stream to the line-interface for transmission over said one or more data links and for forwarding inbound packets received over said one or more data links to one of said plurality of subports in accordance with the label associated with each said inbound packet.

51. The network device according to claim 50, wherein said subport forwarding module is adapted to be implemented in a Field Programmable Gate Array (FPGA).

52. A network device for use in a label switching network, comprising:
a switching fabric;
a line interface adapted to interface to one or more data links;
a plurality of subports, each subport of lesser speed than the speed of said line interface;
a memory for storing executable program code;
a central processor programmed to execute said program code stored in said memory, wherein said program code further comprises:
program code adapted to assign a unique Media Access Control (MAC) address to each subport;
program code to provision inbound traffic to one or more subports in accordance with a label switched path and transmitting resultant subport assignments to an upstream node, said upstream node in communication with network device via said one or more data links;
a subport forwarding module in communication with said line interface and said plurality of subports, said subport forwarding module further comprising:
means for receiving outbound packets from said plurality of subports, each outbound packet assigned to a subport in accordance with the label associated therewith;
means for setting the source MAC address field of each outbound packet to the MAC address of its assigned subport;
means for aggregating the output of a plurality of subports into a high speed packet stream and forwarding said high speed packet stream over said one or more data links; and
means for forwarding inbound packets received over said one or more data links to one of said plurality of subports in accordance with the source MAC address field of each said inbound packet.

53. The network device according to claim 52, wherein said subport forwarding module is adapted to be implemented in a Field Programmable Gate Array (FPGA).

54. The network device according to claim 52, wherein said subport forwarding module comprises a layer 2 switch circuit.

55. A computer program product comprising a computer readable medium having computer readable program code means embodied in said medium, characterized by that upon loading said code means into computer memory a process for performing forwarding of packets to a plurality of subports is executed, said computer program product comprising:
computer readable program code means for provisioning inbound traffic on a downstream node to one or more subports in accordance with a label switched path and transmitting resultant subport assignments to an upstream node, said upstream node in communication with said downstream node via a communications link;
computer readable program code means for forwarding each outbound packet to be transmitted to a subport in said upstream node in accordance with the label associated with said outbound packet previously assigned by said downstream node;

computer readable program code means for aggregating the output of a plurality of subports at said upstream node into a high speed packet stream and forwarding said high speed packet stream over said communications link; and computer readable program code means for forwarding inbound packets transmitted by said upstream node and received over said communications link by said downstream node to a subport in accordance with the label associated with said inbound packet.

* * * * *